US012786376B2

(12) United States Patent
Lai et al.

(10) Patent No.: US 12,786,376 B2
(45) Date of Patent: Nov. 3, 2026

(54) METHODS AND APPARATUS FOR VIDEO CODING USING CTU-BASED HISTORY-BASED MOTION VECTOR PREDICTION TABLES

(71) Applicant: MEDIATEK INC., Hsinchu City (TW)

(72) Inventors: Chen-Yen Lai, Hsinchu City (TW); Tzu-Der Chuang, Hsinchu City (TW); Ching-Yeh Chen, Hsinchu City (TW); Chih-Wei Hsu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/881,445

(22) PCT Filed: May 17, 2023

(86) PCT No.: PCT/CN2023/094713

§ 371 (c)(1),
(2) Date: Jan. 6, 2025

(87) PCT Pub. No.: WO2024/012045

PCT Pub. Date: Jan. 18, 2024

(65) Prior Publication Data

US 2026/0012574 A1 Jan. 8, 2026

Related U.S. Application Data

(60) Provisional application No. 63/486,488, filed on Feb. 23, 2023, provisional application No. 63/368,380, filed on Jul. 14, 2022.

(51) Int. Cl.
*H04N 19/105* (2014.01)
*H04N 19/137* (2014.01)
(Continued)

(52) U.S. Cl.
CPC ......... *H04N 19/105* (2014.11); *H04N 19/137* (2014.11); *H04N 19/176* (2014.11); *H04N 19/1883* (2014.11)

(58) Field of Classification Search
CPC .. H04N 19/105; H04N 19/137; H04N 19/176; H04N 19/1883; H04N 19/70; H04N 19/52
See application file for complete search history.

(56) References Cited

U.S. PATENT DOCUMENTS 12,231,672 B2 * 2/2025 Lee ........................ H04N 19/70
2012/0263235 A1 * 10/2012 Sugio .................. H04N 19/503
375/E7.243

(Continued)

OTHER PUBLICATIONS

International Search Report and Written Opinion dated Jun. 16, 2023, issued in application No. PCT/CN2023/094713.

(Continued)

*Primary Examiner* — Shadan E Haghani
(74) *Attorney, Agent, or Firm* — McClure, Qualey & Rodack, LLP

(57) ABSTRACT

Methods for video coding using CTU-based or multiple History-based MVP (HMVP) tables. According to one method, blocks in the current CTU are encoded or decoded using information comprising a merge list or an AMVP list, where one or more candidates from one or more CTU-based HMVP tables. The CTU-based HMVP tables are maintained and updated on a CTU basis. According to another method, if a to-be-referenced position is not inside the first region, the to-be-referenced position is mapped to a mapped position of the first region before referencing corresponding motion. If the mapped position of the first region has no motion, a predefined default motion or neighbouring motion at a neighbouring position is used as the corresponding motion.

4 Claims, 9 Drawing Sheets

(51) Int. Cl.
*H04N 19/169* (2014.01)
*H04N 19/176* (2014.01)

(56) References Cited

U.S. PATENT DOCUMENTS

| | | | | |
|---|---|---|---|---|
| 2020/0007889 | A1 | 1/2020 | Chao | |
| 2020/0021839 | A1 | 1/2020 | Pham | |
| 2020/0195960 | A1 * | 6/2020 | Zhang | H04N 19/184 |
| 2021/0352315 | A1 | 11/2021 | Zhang | |
| 2022/0070468 | A1 * | 3/2022 | Lee | H04N 19/139 |

OTHER PUBLICATIONS

Zhang, L., et al.; "CE4-related: History-based Motion Vector Prediction;" Joint Video Experts Team (JVET) of ITU-T SG 16 WP 3 and ISO/IEC JTC 1/SC 29/WG 11; Jul. 2018; pp. 1-7.
Han, Y., et al.; "CE4.4.6: Improvement on Merge/Skip mode;" Joint Video Exploration Team (JVET) of ITU-T SG 16 WP 3 and ISO/IEC JTC 1/SC 29/WG 11; Oct. 2018; pp. 1-6.

* cited by examiner

METHODS AND APPARATUS FOR VIDEO CODING USING CTU-BASED HISTORY-BASED MOTION VECTOR PREDICTION TABLES

CROSS REFERENCE TO RELATED APPLICATIONS

The present invention is a non-Provisional application of and claims priority to U.S. Provisional Patent Application No. 63/368,380, filed on Jul. 14, 2022 and U.S. Provisional Patent Application No. 63/486,488, filed on Feb. 23, 2023. The U.S. Provisional patent applications are hereby incorporated by reference in their entireties.

FIELD OF THE INVENTION

The present invention relates to inter prediction for video coding. In particular, the present invention relates to using CTU-based History-based MVP tables for inter prediction.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates invention history-based merge mode, which is reviewed as follows.

History-Based Merge Mode Construction

The History Based Merge Mode stores some previous CU's merge candidates in a history array. For the current CU, besides the original merge mode candidate construction, it can use one or more candidates inside the history array to enrich the merge mode candidates. The details of the History-based Motion Vector Prediction can be found in JVET-K0104 (Li Zhang, et al., "CE4-related: History-based Motion Vector Prediction", Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0104).

In HMVP, a table of HMVP candidates is maintained and updated on-the-fly. After decoding a non-affine inter-coded block, the table is updated by adding the associated motion information as a new HMVP candidate to the last entry of the table. A First-In-First-Out (FIFO) or constraint FIFO rule is applied to remove and add entries to the table. The HMVP candidates can be applied to either merge candidate list or AMVP candidate list.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded block, the associated motion information is added to the last entry of the table as a new HMVP candidate. The overall coding flow is depicted in FIG. 2, where step 210 is performed to load a table with initial HMVP candidates and to update the table with decoded motion information resulted from step 220.

In the case that the table size S is set to be 16, up to 16 HMVP candidates may be added to the table. If there are more than 16 HMVP candidates from the previously coded blocks, a First-In-First-Out (FIFO) rule is applied so that the table always contains the latest previously coded 16 motion candidates. FIG. 3A illustrates an example where the FIFO rule is applied to remove a HMVP candidate and add a new one to the table used in the proposed method.

To further improve the coding efficiency, a constrained FIFO rule is introduced where, when inserting a HMVP to the table, redundancy check is firstly applied to find whether there is an identical HMVP candidate in the table. If found, the identical HMVP candidate is removed from the table and all the HMVP candidates afterwards are shifted, i.e., with indices reduced by 1. FIG. 3B illustrates an example of the constraint FIFO rule, where candidate $NMVP_2$ is found to be redundant and is removed after update.

HMVP candidates can be used in the merge candidate list construction process. All HMVP candidates from the last entry to the first entry in the table are inserted after the TMVP candidate. Pruning is applied on the HMVP candidates. Once the total number of available merge candidates reaches the signalled maximally allowed merge candidates, the merge candidate list construction process is terminated.

Similarly, HMVP candidates can also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In JVET-K0104, K is set to 4.

In addition, when the total merge candidate number is larger than or equal to 15, a truncated unary plus fixed length (with 3 bits) binarization methods is applied to code a merge index. With the total number of merge candidates denoted as $N_{mrg}$, the binarization method is tabulated in Table 1.

TABLE 1

| Bin string of the merge index (assume $N_{mrg}$ is 15) | | | | | | | | | | |
|---|---|---|---|---|---|---|---|---|---|---|
| merge index | Bin String | | | | | | | | | |
| 0 | 0 | | | | | | | | | |
| 1 | 1 | 0 | | | | | | | | |
| 2 | 1 | 1 | 0 | | | | | | | |
| . . . | | | | | | | | | | |
| 5 | 1 | 1 | 1 | 1 | 1 | 0 | | | | |
| 6 | 1 | 1 | 1 | 1 | 1 | 1 | 0 | | | |
| 7 | 1 | 1 | 1 | 1 | 1 | 1 | 1 | 0 | 0 | 0 |
| 8 | 1 | 1 | 1 | 1 | 1 | 1 | 1 | 0 | 0 | 1 |
| . . . | | | | | | | | | | |
| 14 | 1 | 1 | 1 | 1 | 1 | 1 | 1 | 1 | 1 | 1 |
| Bin index | 0 | 1 | 2 | 3 | 4 | 5 | 6 | 7 | 8 | 9 |

During the development of the VVC standard, a coding tool referred as Non-Adjacent Motion Vector Prediction (NAMVP) has been proposed in JVET-L0399 (Yu Han, et al., "CE4.4.6: Improvement on Merge/Skip mode", Joint Video Exploration Team (JVET) of ITU-T SG 16 WP 3 and ISO/IEC JTC 1/SC 29/WG 11, 12th Meeting: Macao, CN, 3-12 Oct. 2018, Document: JVET-L0399). According to the NAMVP technique, the non-adjacent spatial merge candidates are inserted after the TMVP (i.e., the temporal MVP) in the regular merge candidate list. The pattern of spatial merge candidates is shown in FIG. 4. The distances between non-adjacent spatial candidates and current coding block are based on the width and height of current coding block. In FIG. 4, each small square corresponds to a NAMVP candidate and the candidates are ordered (as shown by the number inside the square) according to the distance. The line buffer restriction is not applied. In other words, the NAMVP candidates far away from a current block may have to be stored that may require a large buffer.

In the present invention, methods and apparatus for video coding using CTU-based history-based MVP (Motion Vector Prediction) tables are disclosed to improve performance.

BRIEF SUMMARY OF THE INVENTION

A method for video coding using multiple History-based MVP tables is disclosed. According to the method for a decoder side, coded data associated with a current CTU (Coding Tree Unit) to be decoded are received at a decoder side. Blocks in the current CTU are decoded using information comprising a merge list or an AMVP (Adaptive Notion Vector Prediction) list, and wherein the merge list or the AMVP list comprises one or more first candidates from one or more CTU-based HMVP (History-based MVP) tables. Said one or more CTU-based HMVP tables are updated to generate one or more updated CTU-based HMVP tables by storing motions decoded for the current CTU in one of said one or more CTU-based HMVP tables. The merge list or the AMVP list is updated according to updated information comprising one or more second candidates from said one or more updated CTU-based HMVP tables.

For a corresponding encoder, pixel data associated with a current CTU (Coding Tree Unit) are received. Motions for blocks in the current CTU are derived. The blocks in the current CTU are encoded using information comprising a merge list or an AMVP (Adaptive Motion Vector Prediction) list, and wherein the merge list or the AMVP list comprises one or more first candidates from one or more CTU-based HMVP (History-based MVP) tables. Said one or more CTU-based HMVP tables are updated to generate one or more updated CTU-based HMVP tables by storing the motions derived for the current CTU in one of said one or more CTU-based HMVP tables. The merge list or the AMVP list is updated according to updated information comprising one or more second candidates from said one or more updated CTU-based HMVP tables.

In one embodiment, one corresponding motion for each pre-defined region of the current CTU is stored in said one of said one or more CTU-based HMVP tables. In one embodiment, said each pre-defined region corresponds to an 8×8 or 16×16 block.

In one embodiment, a target motion is stored in said one of said one or more CTU-based HMVP tables after N blocks are decoded, and wherein N is a positive integer. In another embodiment, a target motion is stored in said one of said one or more CTU-based HMVP tables only if the target motion is far from previously stored motions in said one of said one or more CTU-based HMVP tables. In yet another embodiment, a target motion for a corresponding block is stored in said one of said one or more CTU-based HMVP tables only if a horizontal or vertical position of the corresponding block is on an M×M grid, and wherein the M is a positive integer.

In one embodiment, said one or more second candidates from different CTU-based HMVP tables are inserted into the merge list or the AMVP list depending on pre-defined positions and positions of candidates in the different CTU-based HMVP tables. The pre-defined positions can be determined according to a block width and a block height of the blocks in the current CTU.

According to another method, a first region comprising a current CTU (coding tree unit) of the current block is selected to derive one or more first non-adjacent MVP (Motion Vector Prediction). If a to-be-referenced position is not inside the first region, the to-be-referenced position is mapped to a mapped position of the first region before referencing corresponding motion. If the mapped position of the first region has no motion, a predefined default motion or neighbouring motion at a neighbouring position is used as the corresponding motion.

In one embodiment, the neighbouring position corresponds to a left 4×4 block, a right 4×4 block, a top 4×4 block, or a bottom 4×4 block of the mapped position, or a first left or right 4×4 block of the mapped position having motion information.

DETAILED DESCRIPTION OF THE INVENTION

Figure 1A:
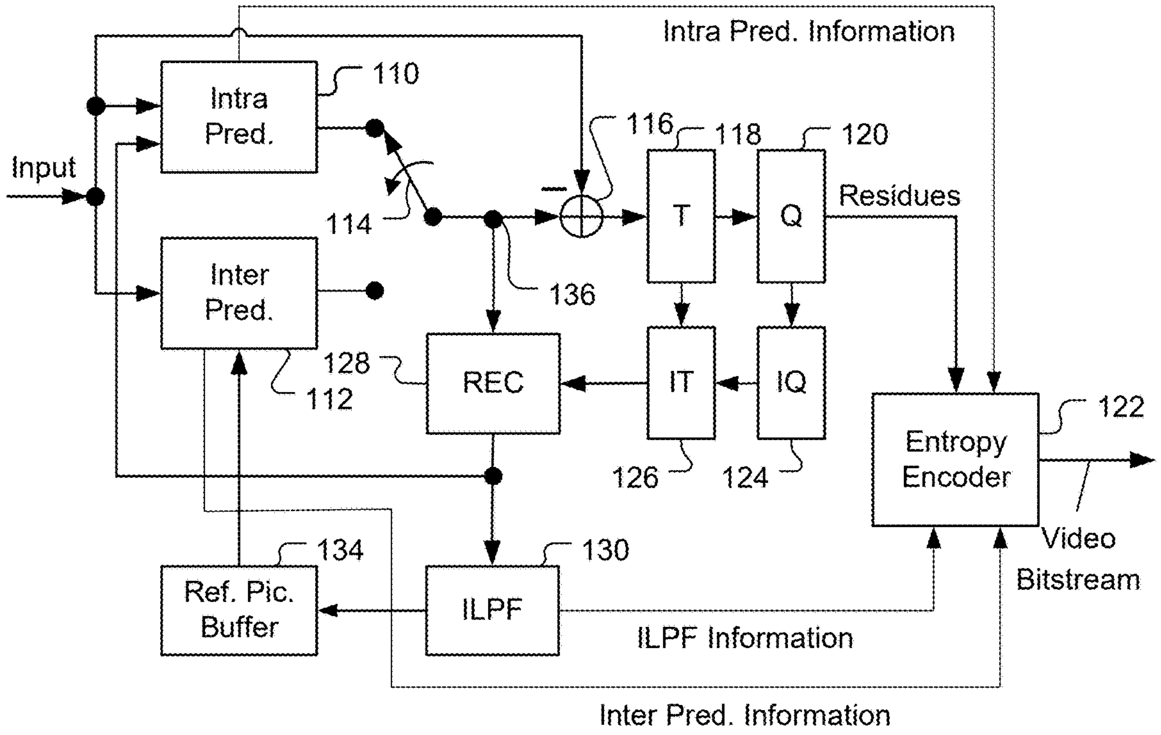
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In order to improve the coding efficiency of HMVP, some methods are disclosed to add more HMVP tables to increase the diversity of HMVP candidates.

Method 1: Multi-HMVP Tables

In one embodiment, it is proposed to use more than one HMVP table generated by applying different updating rules, such as different updating frequencies. For example, one look-up table (LUT-0) is updated per CU. Another look-up table (LUT-1) is update once within 5 CUs. The HMVP table is also referred as a look-up table in this disclosure since the look-up table can be used to implement the HMVP table. According to another embodiment, the updating rule can be related to partition results associated with a CU, such as quadtree depth, binary tree depth or the number of partitions associated with the CU. For example, LUT-0 is updated only if the QT depth/BT depth/partition time of the current block is smaller than 3. LUT-1 is updated only if the QT depth/BT depth/partition time of the current block is larger than 3.

In another embodiment, it is proposed to use more than one HMVP table generated based on the difference between the to-be added motion and the motions stored in LUT, where the difference is called as MVD. For example, one motion vector is used to update LUT-0 if the absolute value of MVD between the to-be added motion and any other motions in LUT-0 are all larger than threshold, such as 0. One motion vector is used to update LUT-1 if the absolute value of MVD between the to-be added motion and any other candidates in LUT-1 are all larger than another threshold, such as 32.

In another embodiment, it is proposed to use more than one HMVP table generated based on position of a corresponding CU. For example, LUT-0 is updated only if the top-left position of to-be inserted CU's position is in 128×128 grid. LUT-1 is updated only if the top-left position of to-be inserted CU's position is in 64×64 grid.

In another embodiment, it is proposed to store not only the motion information in the LUT, but also the position of current CU. By doing so, more than one HMVP table can be created based on the position of current CU. In one embodiment, the horizontal distance or vertical distance between the to-be inserted CU and any CU having motion information stored in the HMVP table can be used to determine whether to insert the motion information. For example, one motion information (e.g. motion vector) is used to update LUT-0 if the horizontal distance or vertical distance between the to-be inserted CU and any CU having motion information stored in LUT-0 is larger than a threshold, such as 16. One motion information (e.g. motion vector) is used to update LUT-1 if the horizontal distance or vertical distance between the to-be inserted CU and any CU having motion information stored in LUT-1 is larger than another threshold, such as 64.

In another embodiment, it is proposed to create more than one HMVP table based on the sign values of MVx, and MVy. For example, 4 HMVP tables are created: LUT-0 is used to store motion vectors with sign (MVx)>=0 and sign (MVy) >=0; LUT-1 is used to store motion vectors with sign (MVx)<0 and sign (MVy)>=0; LUT-2 is used to store motion vectors with sign (MVx)>=0 and sign (MVy)>0; and LUT-3 is used to store motion vector with sign (MVx)<0 and sign (MVy)<0. For another example, 8 HMVP tables are creates for 8 kinds of sign (MVx, Mvy) pair.

In another embodiment, it is proposed to create more than one HMVP table based on CU's prediction mode. For example, 2 HMVP tables are created: LUT-0 is used to store motion vectors from merge mode and LUT-1 is used to store motion vectors from non-merge mode.

In addition, the above-mentioned embodiments can be further constrained so that if one LUT is updated, other LUTs cannot be updated. In other words, one motion information is used to update only one LUT.

In addition, the above-mentioned embodiments can be further combined. For example, LUT-0 is updated with CUs in 128×128 grid, and the motion will be inserted if it is different from any other motion in LUT-0. LUT-1 is updated with CUs in 128×128 grid, and the motion will be inserted if the MVDs between the to-be inserted motion information and any other motion information in LUT-1 are larger than a threshold, such as 64.

In another embodiment, the spatial domain multi-HMVP tables can be generated. For example, one LUT is updated within N CTUs. That is, in this LUT, only the motion information in these N CTUs can be used to update the LUT. N can be any positive integer larger than 0. In this way, motion information from cross-CTU/cross-CTU-rows can be used by referencing spatial domain multi-HMVP tables. In additional, it can be further constrained that only above M CTU row' LUTs will be kept.

Method 2: Inserting Candidates from Multi-HMVP Tables to Merge Candidate List or AMVP MVP List According to this method, N candidates in more than one HMVP tables can be selected to insert into the merge candidate list or AMVP MVP list. N can be any integer larger than 0.

In one embodiment, HMVP LUTs not only store the motion information, but also the left-top position of the to-be inserted CU. After that, the N candidates are selected based on the CU's position. For example, the motion information with CU's positions closest to current CU will be selected before the motion information with CU's position far away from the current CU. In another embodiment, the motion information with CU's position far away from the current CU will be selected first before the motion information with CU's position close to the current CU.

In another embodiment, the N candidates are selected based on the distance between the current CU and corresponding CUs with motion information stored in the LUT. The distances are designed according to the current CU width and height. For example, the distances between the current CU and corresponding CUs with the motion information stored in the LUT are larger than CU width or height and smaller than two times of CU width and height will be inserted first. After that, the distances between the current CU and the corresponding CUs with the motion information stored in the LUT are larger than two times of CU width or height and smaller than three times of CU width and height will be inserted.

In one embodiment, N additional HMVP LUTs are used. The candidates from M of them are added from old to new. (N-M) of them are added from new to old.

In one embodiment, more than one HMVP LUT is used. The candidates are added in an interleaving manner. For example, the newest motion in LUT-0 is added first. And then, the newest motion in LUT-1 is added. And then, the newest motion in LUT-2 is added. After that, the second newest motion in LUT-0 is added. And then, the second newest motion in LUT-1 is added. And then, the second newest motion in LUT-2 is added. For another example, K candidates in the promising LUT-A are inserted first, and then interleave to added motions from other LUTs.

In another embodiment, more than one LUT are used. The added LUT order is designed based on the current CU size. For example, 3 LUTs are used. LUT-0 is updated by motions from the CU in 16×16 grid. LUT-1 is updated by motions from the CU in 64×64 grid. When current CU's position is in 16×16 grid, candidates from LUT-0 are inserted before candidates from LUT-1.

Any of the foregoing proposed inter prediction based on multiple HMVP methods can be combined with each other. For example, Method 1 can be used with Method 2 together.

Method 3: Limiting the Available Region of Non-Adjacent Spatial Merge Candidate

Method 3 is proposed to further reduce the bandwidth for supporting the non-adjacent spatial merge candidate. In one embodiment, only the motion information in the current CTU can be referenced by the non-adjacent spatial merge candidate. In another embodiment, only the motion information in the current CTU or left M CTUs can be referenced by the non-adjacent spatial merge candidate. M can be any integer larger than 0. In another embodiment, only the motion information in the current CTU row can be referenced by the non-adjacent spatial merge candidate. In one embodiment, only the to-be referenced position within the current CTU row or above N CTU rows can be referenced. N can be any integer larger than 0.

In another embodiment, the motion information in the current CTU, the current CTU row, the current CTU row+above N CTU rows, the current CTU+left M CTUs, or the current CTU+above N CTU rows+left M CTUs can be referenced without limits. Furthermore, the motion information in other regions can only be referenced by a larger pre-defined unit. For example, the motion information in the current CTU row is stored within a 4×4 grid, and for other motion information outside the current CTU row is stored within a 16×16 grid. In other words, one 16×16 region only needs to store one motion information, so the to-be referenced position shall be rounded to the 16×16 grid, or changed to the nearest position of 16×16 grid.

Figure 5:
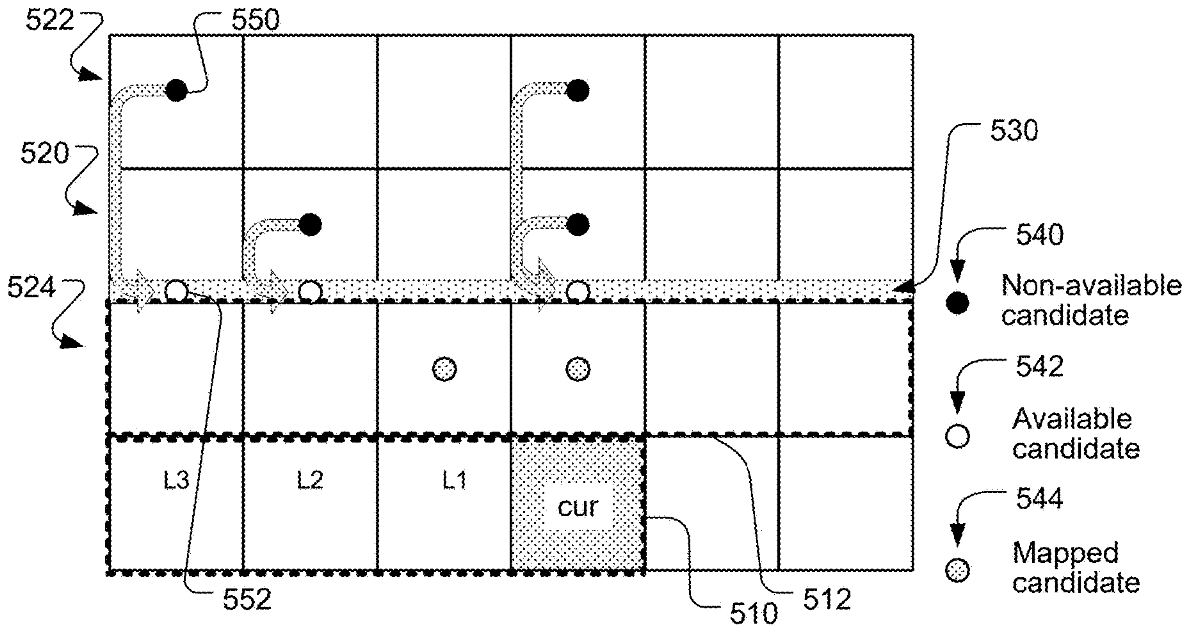
FIG. 5 illustrates an example to map motion information for the to-be referenced positions in a non-available region to pre-defined positions, where the pre-defined positions are located at one line above the above-first CTU row.

In another embodiment, the motion information in the current CTU row, or the current CTU row+M CTU rows can be referenced without limits, and for the to-be referenced positions in the above CTU row, the positions will be mapped to one line above of current CTU, or the current CTU row+M CTU rows for referencing. This design can preserve most of the coding efficiency and doesn't increase buffer by much for storing the motion information of above CTU rows. For example, the motion information in the current CTU row (510) and the first CTU row above (512) can be referenced without limits; and for the to-be referenced positions in the above-second (520), above-third (522), above-fourth CTU row, and so on, the positions will be mapped to one line (530) above the above-first CTU row before referring (as shown in FIG. 5). In FIG. 5, A dark circle indicates a non-available candidate540, an empty circle indicates an available candidate 542 and a dot-filled circle indicates a non-available candidate 544. For example, the non-available candidate 550 in the above-second (520) CTU row is mapped to an available candidate 552 in one line (530) above the above-first CTU row (524).

In the above example, the region that can be referenced without limits is close to the current CTU (e.g. the current CTU row or the above-first CTU row). However, the region according to the present invention is not limited to the exemplary region shown above. The region can be larger or smaller than the example shown above. In general, the region can be limited to be within one or more pre-define distances in a vertical direction, a horizontal direction or both from the current CTU. In the above example, the region is limited to 1 CTU height in the above vertical direction, which can be extended to 2 or 3 CTU heights if desired. In the case that left M CTUs are used, the limit is M CTU width for the current CTU row. The horizontal position of a to-be referenced position and the horizontal position of a mapped pre-defined position can be the same (e.g. position 550 and position 552 in the same horizontal position). However, other horizontal position may also be used.

Figure 6:
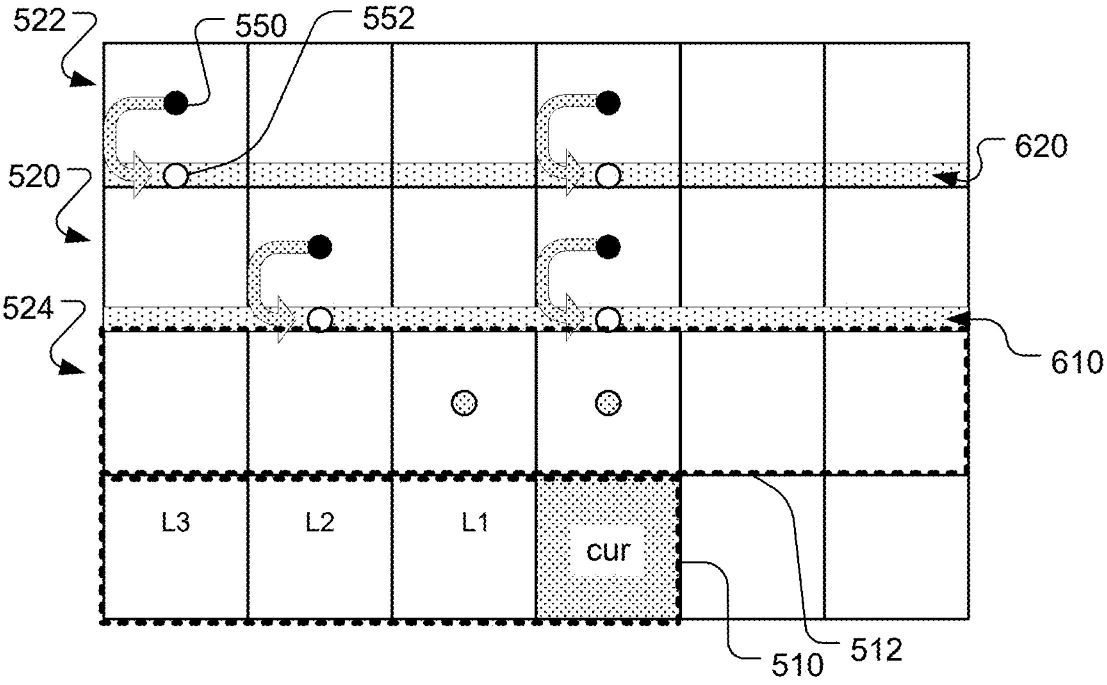
FIG. 6 illustrates an example to map motion information for the to-be referenced positions in a non-available region to pre-defined positions, where the pre-defined positions are located at the bottom line of respective CTU rows.

In another embodiment, the motion information in the current CTU row, or the current CTU row+M CTU rows can be referenced without limits. Furthermore, for the to-be referenced positions in the above CTU row, the positions will be mapped to the last line of the corresponding CTU row for referencing. For example, as shown in FIG. 6, the motion information in the current CTU row (510) and the first CTU row (512) above can be referenced without limits, and for the to-be referenced positions in the above-second CTU row (520), the positions will be mapped to the bottom line (610) of the above-second CTU row (520) before referring. For the to-be referenced positions in above third CTU row (522), the positions will be mapped to the bottom line (620) of the above-third CTU row (522) before referring. The legend for the candidate types (i.e., 540, 542 and 544) of FIG. 6 is the same as that in FIG. 5.

Figure 7:
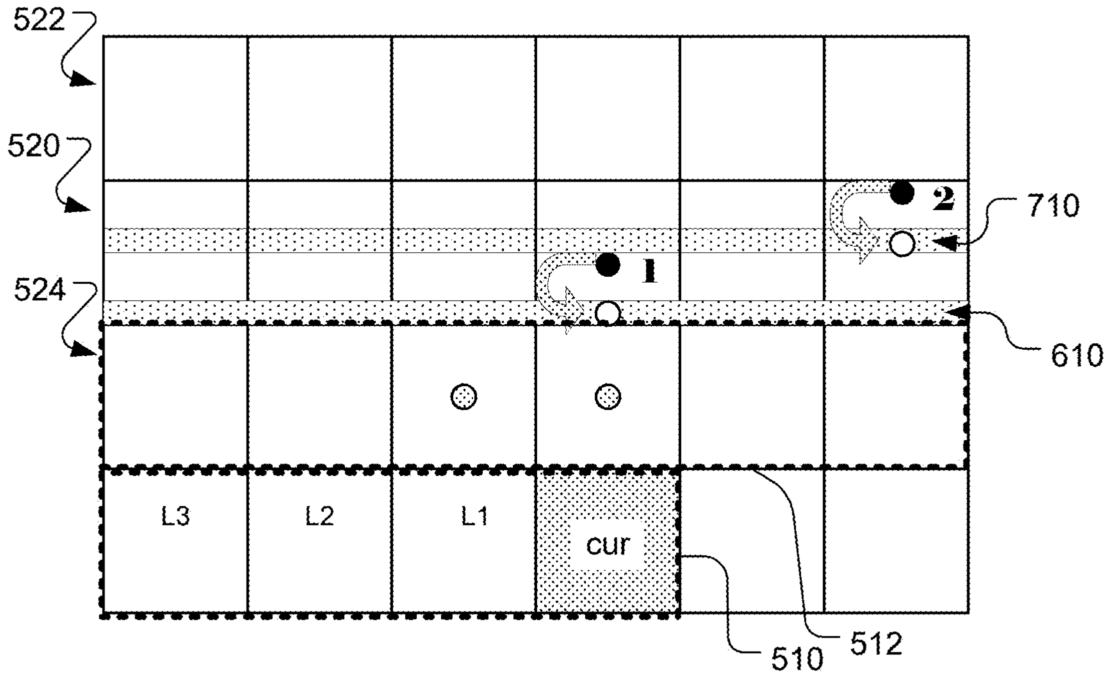
FIG. 7 illustrates an example to map motion information for the to-be referenced positions in a non-available region to pre-defined positions, where the pre-defined positions are located at the bottom line or the centre line of respective CTU rows.

In another embodiment, the motion information in the current CTU row, or the current CTU row+M CTU rows can be referenced without limits, and for the to-be referenced positions in above CTU row, the positions will be mapped to the last line or bottom line or centre line of the corresponding CTU row for referencing depending on the position of the to-be referenced motion information. For example, as shown in FIG. 7, the motion information in the current CTU row (510) and the above-first CTU row (512) can be referenced without limits, and for the to-be referenced position 1 in above-second CTU row (520), the positions will be mapped to the bottom line (610) of the above-second CTU row before referring. However, for the to-be referenced position 2 in above-second CTU row, the positions will be mapped to the centre line (710) of the above-second CTU row (520) before referring since it is closer to the centre line (710) compared with bottom line (610). The legend for the candidate types (i.e., 540, 542 and 544) of FIG. 7 is the same as that in FIG. 5.

Figure 8:
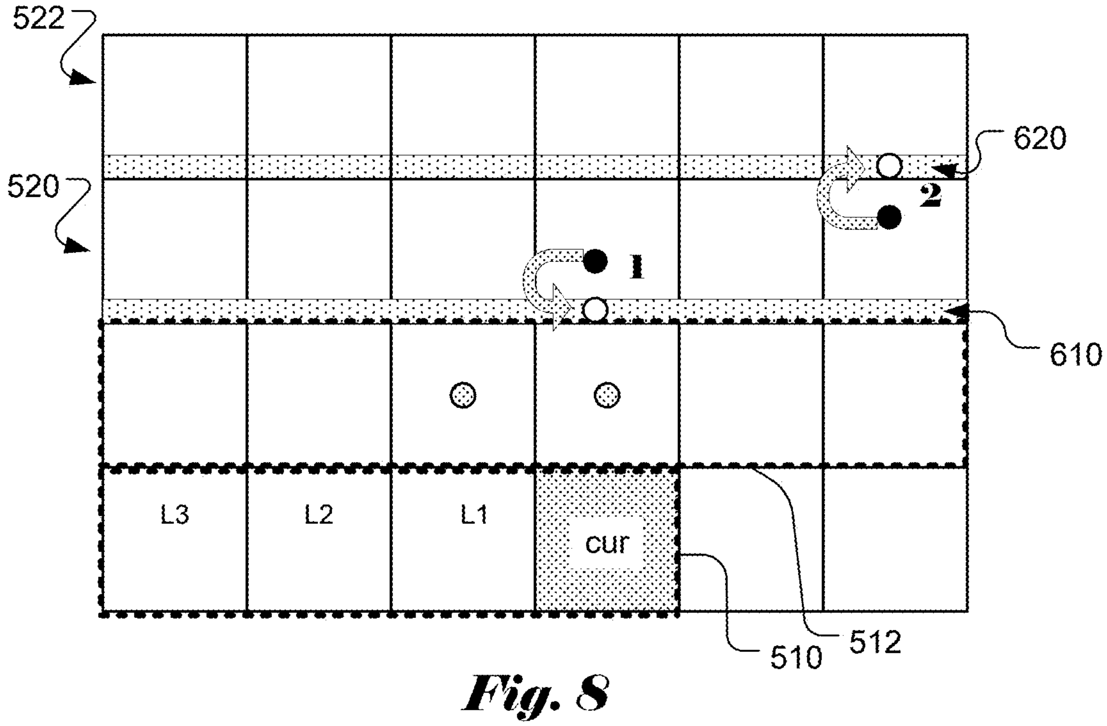
FIG. 8 illustrates an example to map motion information for the to-be referenced positions in a non-available region to pre-defined positions, where the pre-defined positions are located at the bottom line of respective CTU rows or one CTU row above the respective CTU rows.

In another embodiment, the motion information in the current CTU row, or the current CTU row+M CTU rows can be referenced without limits, and for the to-be referenced positions in the above CTU row, the positions will be mapped to the last line or bottom line of the corresponding CTU row for referencing depending on the position of the to-be referenced motion information. For example, as shown in FIG. 8, the motion information in the current CTU row (510) and the above-first CTU row (512) can be referenced without limits, and for the to-be referenced position 1 in the above-second CTU row (520), the positions will be mapped to the bottom line (610) of the above-second CTU row (520) before referring. However, for the to-be referenced position 2 in the above-second CTU row (520), the positions will be mapped to the bottom line (620) of the above-third CTU row (522) before referring since it is closer to the bottom line (620) of the above-third CTU row compared with bottom line (610) of the above-second CTU row as shown in FIG. 8. The legend for the candidate types (i.e., 540, 542 and 544) is the same as that in FIG. 5.

In another embodiment, the motion information in the current CTU, or the current CTU+N left CTU can be referenced without limits, and for the left CTUs, the to-be referenced positions will be mapped to the very right line closest to the current CTU, or the current CTU+N left CTU. For example, the motion information in the current CTU and first left CTU can be referenced without limits, and if the to-be referenced positions are in the second left CTU, the positions will be mapped to one line left to the first left CTU before referring. If the to-be referenced positions are in the third left CTU, the positions will be mapped to one line left to first left CTU before referring. For example, the motion information in the current CTU and the first left CTU can be referenced without limits, and if the to-be referenced positions are in the second left CTU, the positions will be mapped to the very right line of the second left CTU before referring. If the to-be referenced positions are in the third left CTU, the positions will be mapped to the very right line to the third left CTU before referring.

Method 4: Storing Spatial-HMVP in CTU-Based Look-Up-Tables (LUTs)

In one embodiment, CTU-based HMVPs are used to keep motions within each CTU. That is, after decoded one CTU, all motions within this CTU will be stored in one CTU-based HMVP LUT. For the current CU, it can reference different motions in different CTUs from the corresponding CTU-based HMVP LUTs. For example, motions from above CTU, above-right CTUs, above-left CTUs, or left CTUs can be referenced from different CTU-based HMVP LUTs.

In another embodiment, not every motions in one CTU are kept for CTU-based HMVPs. For example, within one pre-defined region (e.g. 8×8 or 16×16), only one motion will be kept. For another example, one motion will be kept for CTU-based HMVPs after decoded N CUs. For another example, only if the to-be-kept motion's position is far from all previous decoded motions stored in HMVP, it can be kept for CTU-based HMVPs. For another example, only if the to-be-inserted motion from a CU with position x-axis or y-axis in an M×M grid, the motion will be kept for CTU-based HMVPs. N and M in previous examples can be any integer larger than zero.

In another embodiment, the HMVPs from different CTUs can be inserted based on a group of pre-defined positions. For example, the positions can be designed like JVET-L0399 (FIG. 5). For another example, the positions are designed based on the width and height of the current CU. In another embodiment, the allowed referencing motions region can be constrained to control the usage of motion buffer. For example, only if motions in the current CTU row and one line above the current CTU row can be referenced. Candidates of pre-defined positions from other CTU rows will be mapped to the corresponding positions of one line above current CTU row before referencing. The allowed referencing motions region can also be constrained by any other constraints mentioned in Method 3.

It is proposed to not only store the motion information, but also the left-top and bottom-right positions of the CU (i.e., positions of a candidate) in HMVP. With this technique, a pre-defined position can be checked to determine if it is covered by motions stored in HMVP. If a pre-defined position is to the right and below of a HMVP's left-top position and is to the left and top of a HMVP's right-bottom position, a pre-defined position is covered by the CU of the HMVP. Accordingly, candidates from different CTU-based HMVP can be inserted into the merge or AMVP list depending on the pre-defined positions and the positions of the candidates in different CTU-based HMVP tables.

It is proposed to not only store the motion information, but also the centre positions of the CU in HMVP. With this technique, a pre-defined position can be checked if it is covered by motions stored in HMVP. If a pre-defined position is very closed to the centre position of a HMVP, a pre-defined position is treated as covered by the CU of the HMVP.

In another embodiment, if the pre-defined referencing position is not available, the motion from a CU covering the corresponding position stored in spatial-HMVP LUTs can be used. Otherwise, the pre-defined referencing position will be mapped to the nearest allowed region. For example, the not-allowed referenced position may be the position outside current CTU row. The pre-defined referencing positions in the above CTU row will be check to determine if it can be covered by any spatial HMVPs. If they can be covered by spatial HMVPs, the motions of this corresponding spatial HMVP will be used for referencing. Otherwise, they will be mapped to the bottom line of the first above CTU row.

For another example, if the pre-defined referencing position is not available, the motion from a CU nearest to the corresponding position stored in spatial-HMVP LUTs can be used.

For spatial HMVPs mentioned above, the candidates covered by a pre-defined region can be stored in the same LUT. For example, motions in one CTU can be stored in one spatial-HMVP LUT. For another example, motions in one N×M region can be stored in one LUT, where N and M can be any integer larger than zero. The N×M can be designed based on picture's resolution, CTU size, decoded unit size, or QP.

Method 5: Using a Predefined Motion if a Mapped Position Doesn't have Motion Information In one embodiment, in the above-mentioned methods, a pre-defined region is allowed for referencing. If a to-be-referenced position is not inside the allowed region, it will be mapped to the corresponding position of the allowed region before referencing. If the mapped position has motion, it can be directly referenced. Otherwise, the mapped candidate becomes invalid. For example, the mapped block is coded by intra mode, intraTMP mode, MIP mode, TIMD, DIMD, IBC mode and so on.

To increase the valid candidate number, in one embodiment, a pre-defined default motion can be used, such as (MVx, Mvy)=(−cuWidth, −cuHeight), or (MVx, Mvy)=(−N*cuWidth, −M*cuHeight), or the MV that is designed based on the farthest position allowed for referencing. For another embodiment, a neighbouring position's motion will be used, such as one of 4×4 block on the left hand side of mapped position, one of 4×4 block on the right hand side of mapped position, the left first 4×4 block contains motion information, or the right first 4×4 block contains motion information, or the top first 4×4 block contains motion information, or bottom first 4×4 block contains motion information.

Figure 1B:
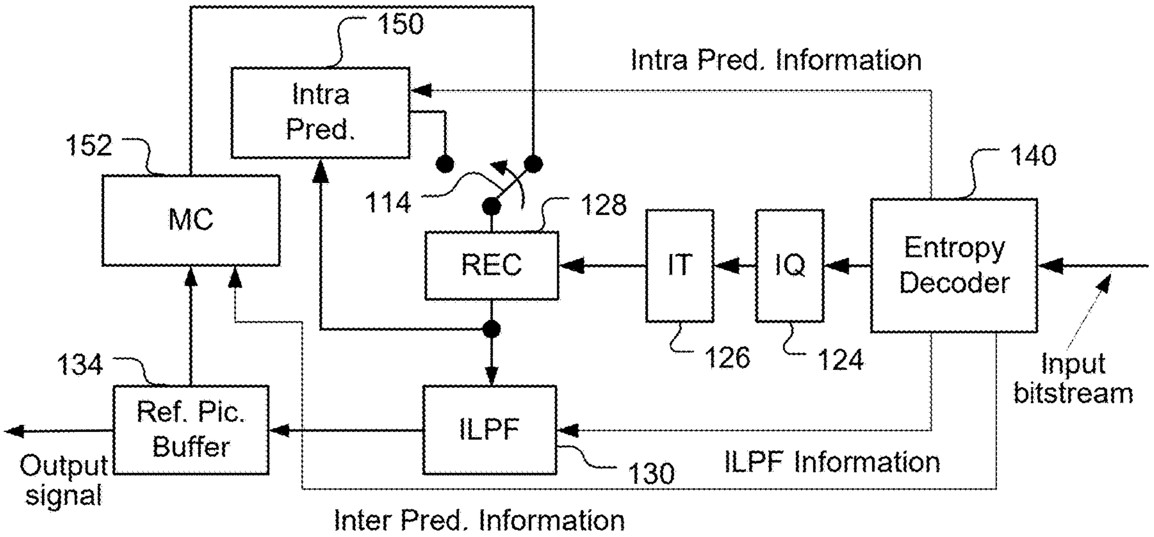
FIG. 1B illustrates a corresponding decoder for the encoder in FIG. 1A.
Figure 2:
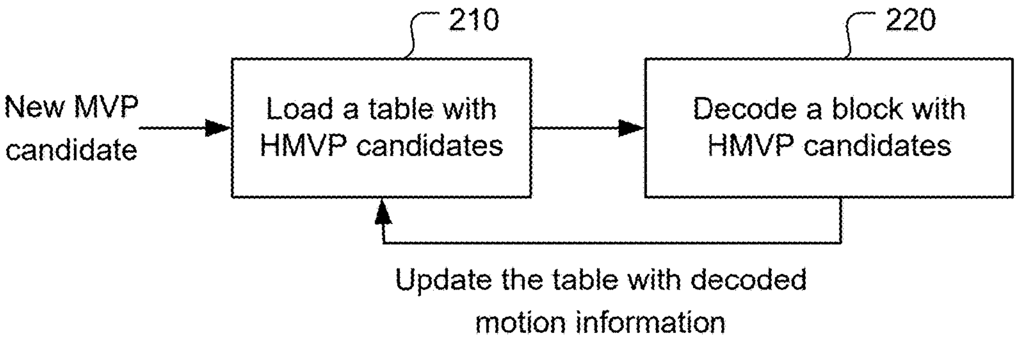
FIG. 2 illustrates an exemplary process flow for a decoder incorporating History-based MVP candidate list.
Figure 3A:
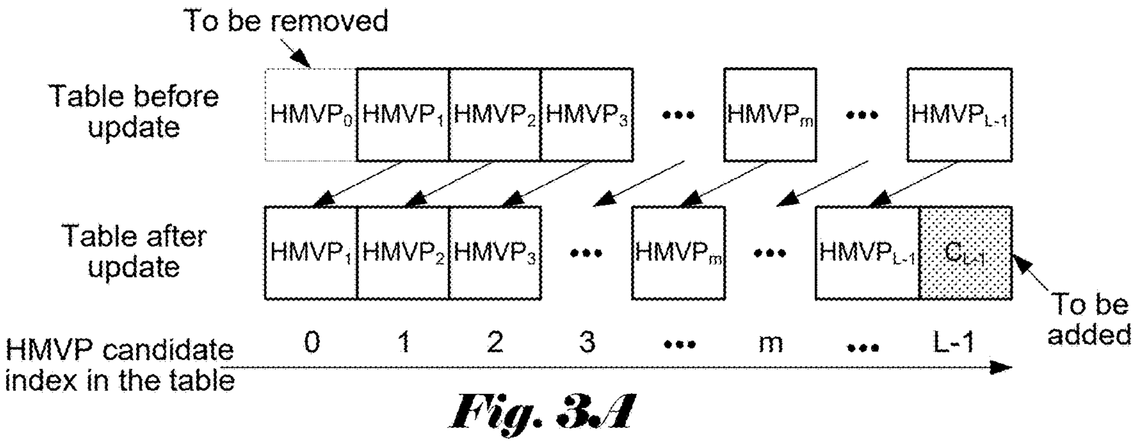
FIG. 3A illustrates an example of updating the HMVP table using FIFO (First-In-First-Out) structure.
Figure 3B:
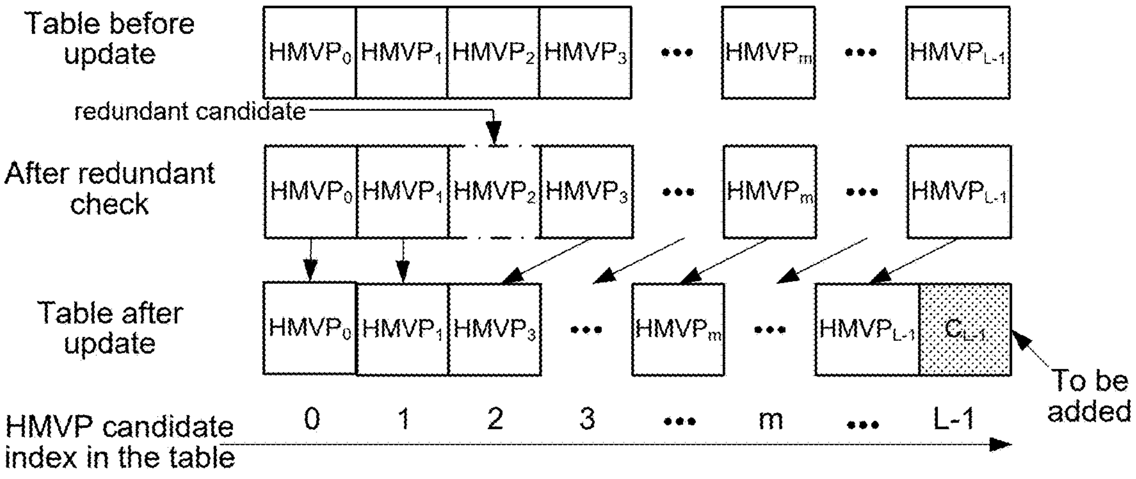
FIG. 3B illustrates an example of updating the HMVP table using constrained FIFO (First-In-First-Out) structure.
Figure 4:
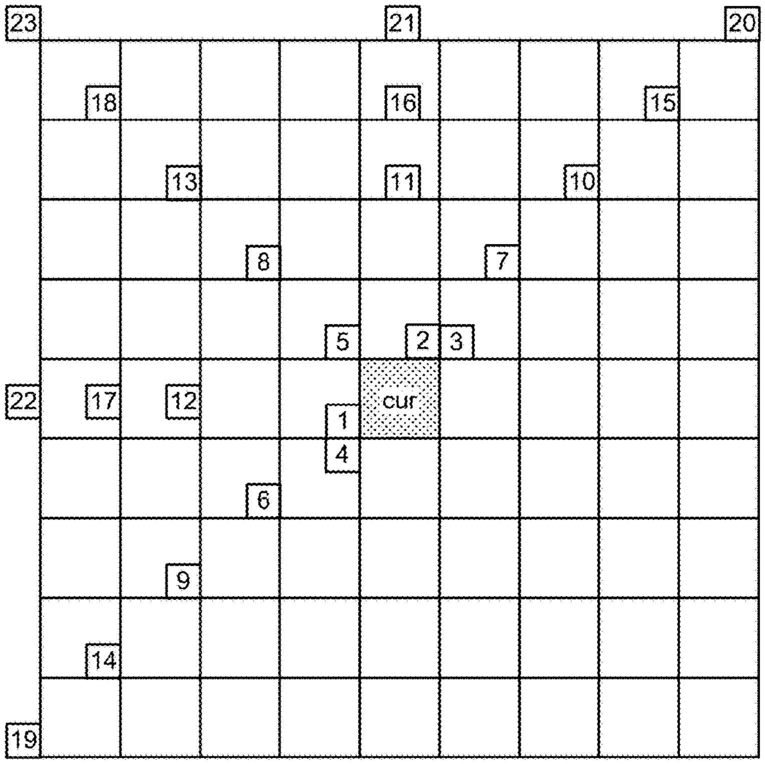
FIG. 4 illustrates an exemplary pattern of the non-adjacent spatial merge candidates.

Any of the foregoing proposed inter prediction based on CTU-based HMVP method or the multiple HMVP with non-adjacent MVP method can be implemented in encoders and/or decoders. For example, any of the proposed methods can be implemented in an inter coding module of an encoder (e.g. Inter Pred. 112 in FIG. 1A) or in an inter coding module (e.g. MC 152 in FIG. 1B) of a decoder, or a merge candidate list AMVP candidate list derivation module at the encoder or decoder. Alternatively, any of the proposed methods can be implemented as one or more circuits or processors coupled to the inter/intra/prediction/entropy coding modules of the encoder and/or the inter/intra/prediction/entropy coding modules of the decoder, so as to process the data or provide the information needed by the inter/intra/prediction module.

Figure 9:
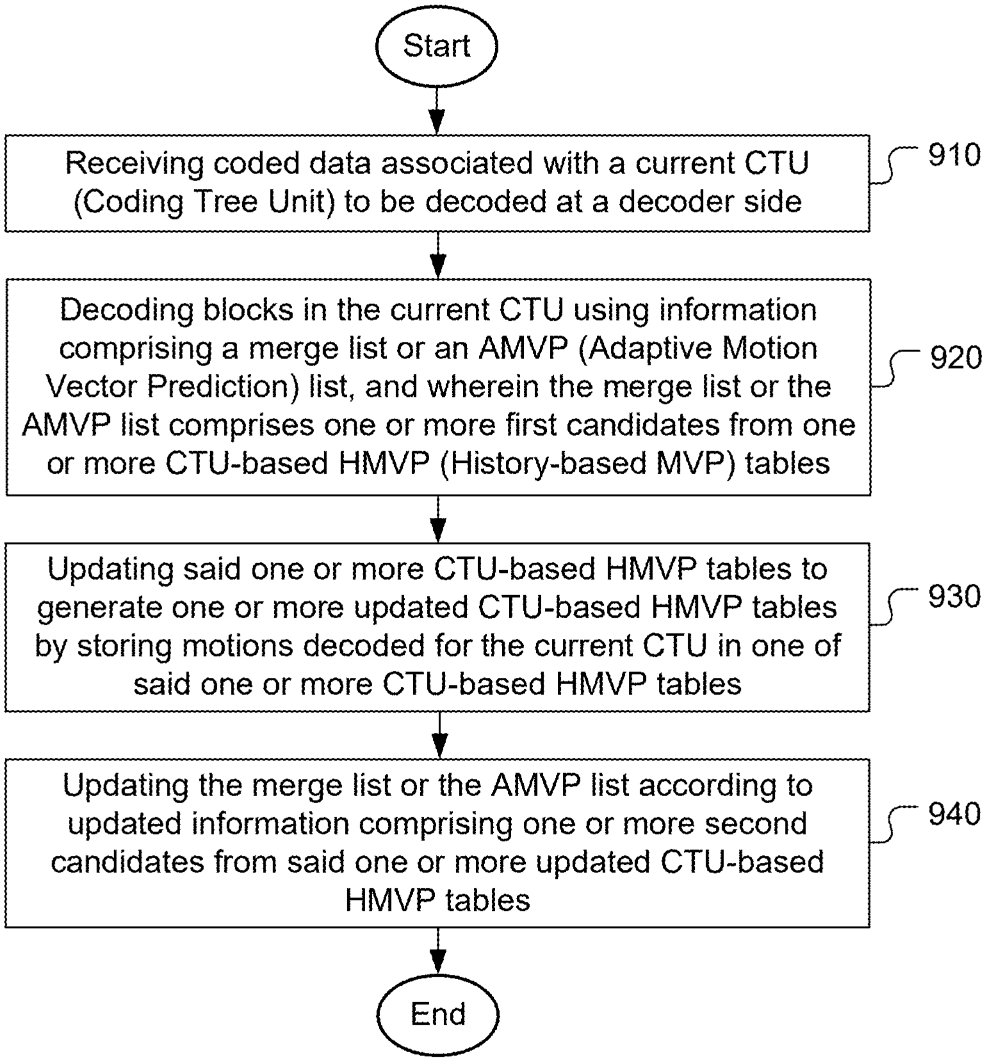
FIG. 9 illustrates a flowchart of an exemplary video decoding system that incorporates CTU-based History-based MVP tables according to one embodiment of the present invention.

FIG. 9 illustrates a flowchart of an exemplary video decoding system that incorporates CTU-based History-based MVP tables according to one embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, coded data associated with a current CTU (Coding Tree Unit) to be decoded are received on step 910. Blocks in the current CTU are decoded using information comprising a merge list or an AMVP (Adaptive Motion Vector Prediction) list in step 920, and wherein the merge list or the AMVP list comprises one or more first candidates from one or more CTU-based HMVP (History-based MVP) tables. Said one or more CTU-based HMVP tables are updated to generate one or more updated CTU-based HMVP tables by storing motions decoded for the current CTU in one of said one or more CTU-based HMVP tables in step 930. The merge list or the AMVP list is updated according to updated information comprising one or more second candidates from said one or more updated CTU-based HMVP tables in step 940.

Figure 10:
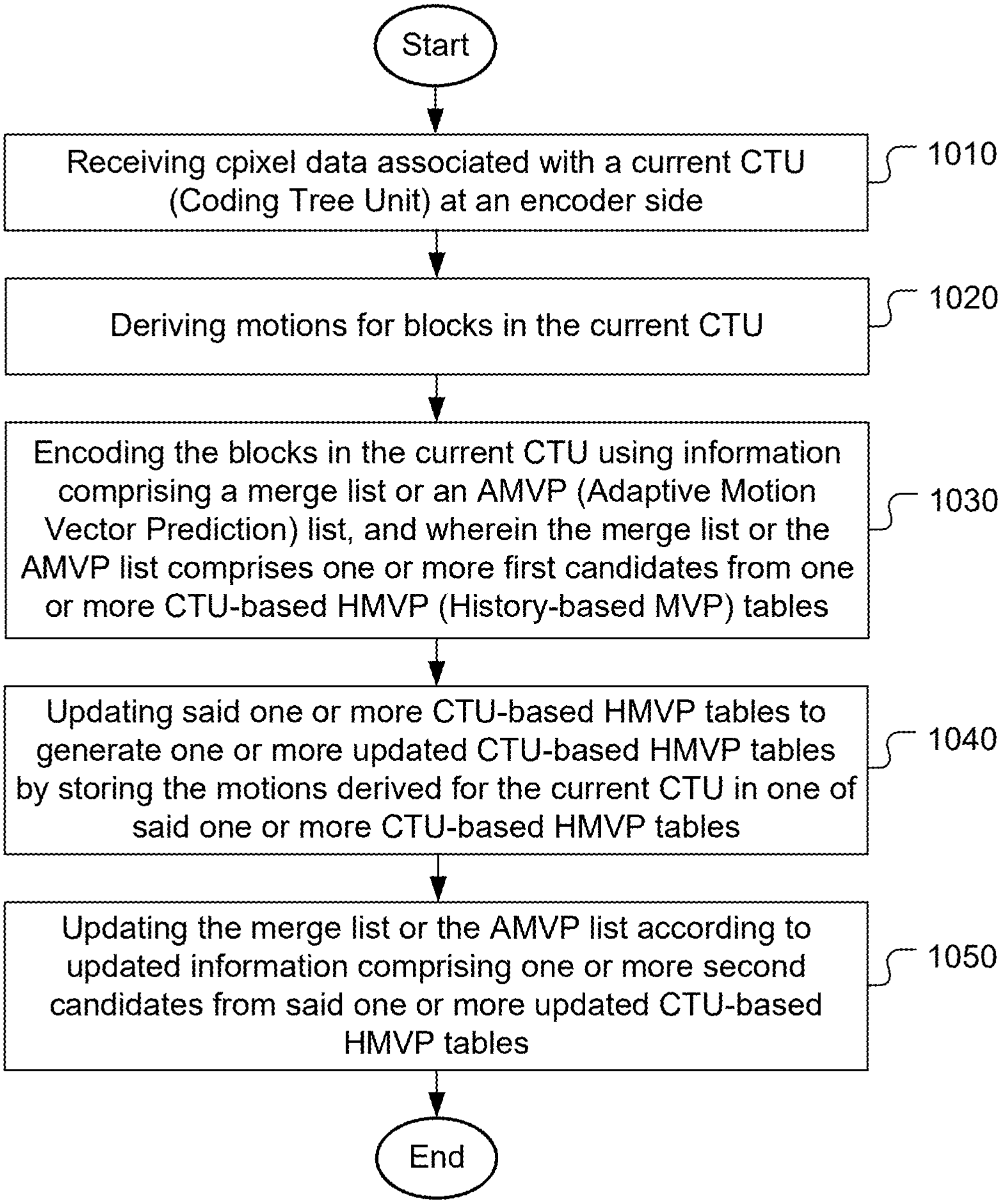
FIG. 10 illustrates a flowchart of an exemplary video encoding system that incorporates CTU-based History-based MVP tables according to one embodiment of the present invention.

FIG. 10 illustrates a flowchart of an exemplary video encoding system that incorporates CTU-based History-based MVP tables according to one embodiment of the present invention. According to this method, pixel data associated with a current CTU (Coding Tree Unit) are received in step 1010. Motions for blocks in the current CTU are derived in step 1020. The blocks in the current CTU are encoded using information comprising a merge list or an AMVP (Adaptive Motion Vector Prediction) list in step 1030, and wherein the merge list or the AMVP list comprises one or more first candidates from one or more CTU-based HMVP (History-based MVP) tables. Said one or more CTU-based HMVP tables are updated to generate one or more updated CTU-based HMVP tables by storing the motions derived for the current CTU in one of said one or more CTU-based HMVP tables in step 1040. The merge list or the AMVP list is updated according to updated information comprising one or more second candidates from said one or more updated CTU-based HMVP tables in step 1050.

Figure 11:
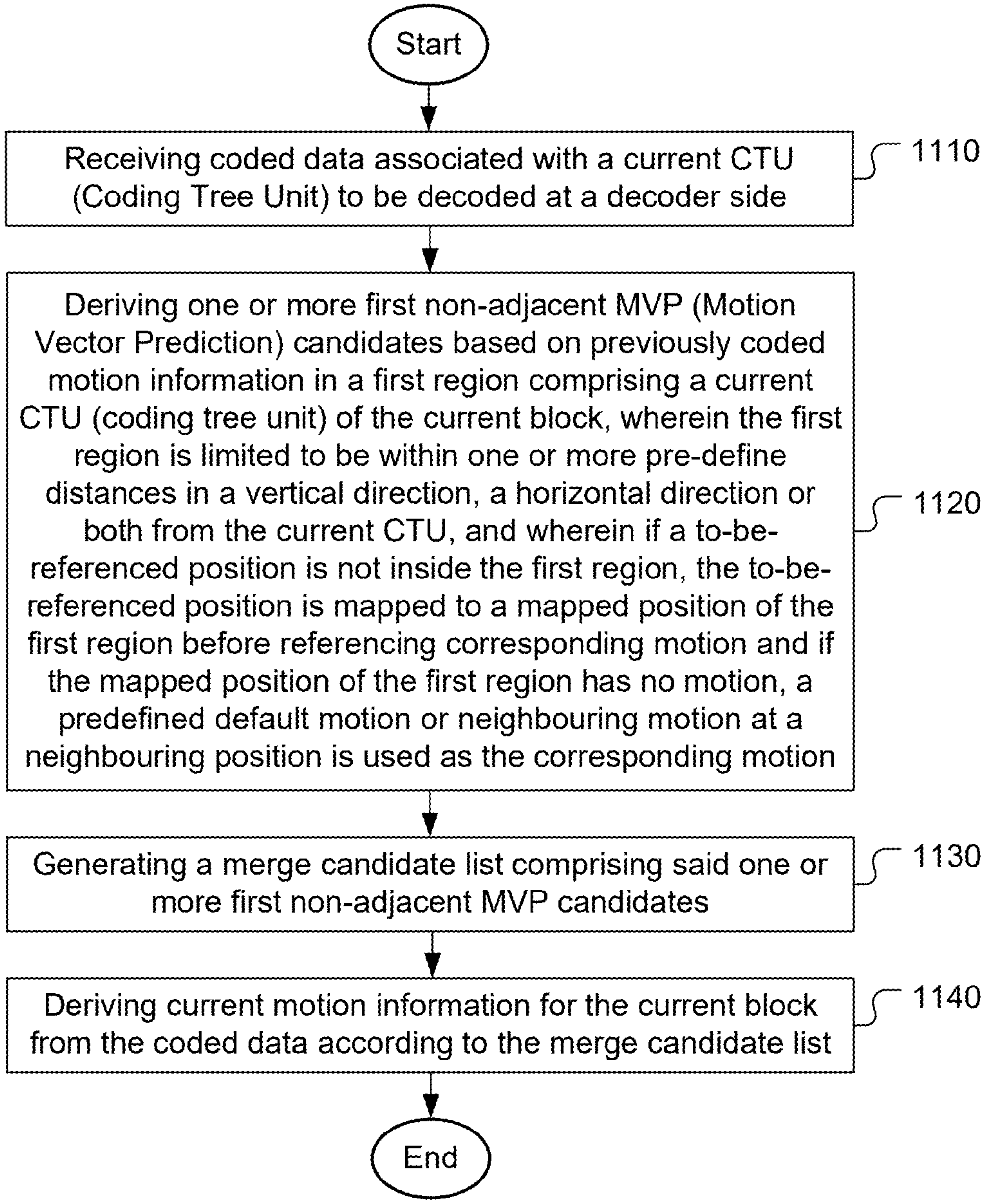
FIG. 11 illustrates a flowchart of another exemplary video decoding system that incorporates Non-Adjacent History-based MVP tables according to one embodiment of the present invention.

FIG. 11 illustrates a flowchart of another exemplary video decoding system that incorporates Non-Adjacent History-based MVP tables according to one embodiment of the present invention. According to this method, coded data associated with a current block to be decoded are received in step 1110. One or more first non-adjacent MVP (Motion Vector Prediction) candidates are derived based on previously decoded motion information in a first region comprising a current CTU (coding tree unit) of the current block in step 1120, wherein the first region is limited to be within one or more pre-define distances in a vertical direction, a horizontal direction or both from the current CTU, and wherein if a to-be-referenced position is not inside the first region, the to-be-referenced position is mapped to a mapped position of the first region before referencing corresponding motion and if the mapped position of the first region has no motion, a predefined default motion or neighbouring motion at a neighbouring position is used as the corresponding motion. A merge candidate list comprising said one or more first non-adjacent MVP candidates is generated in step 1130. Current motion information for the current block is derived from the coded data according to the merge candidate list in step 1140.

Figure 12:
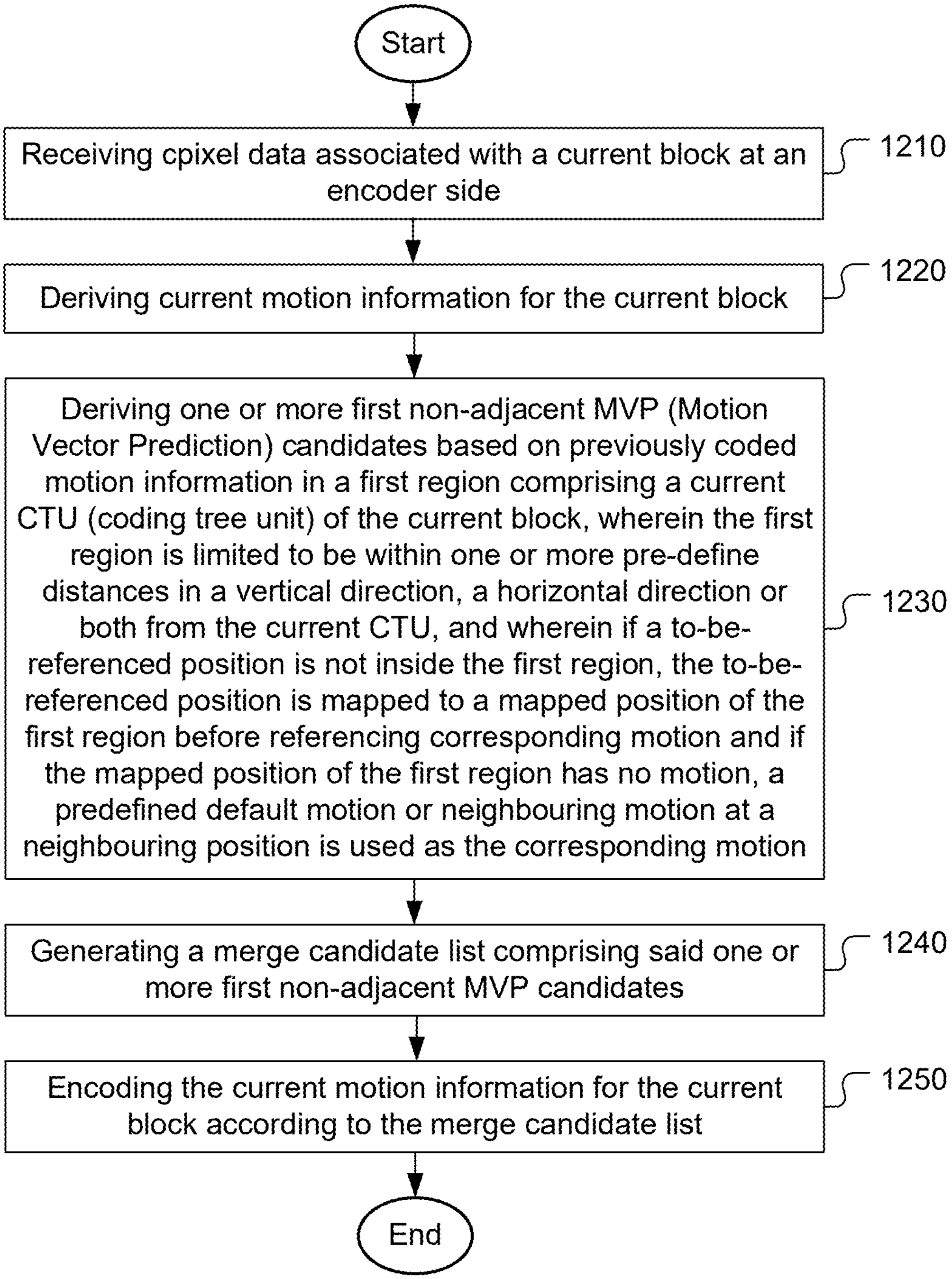
FIG. 12 illustrates a flowchart of another exemplary video encoding system that incorporates Non-Adjacent History-based MVP tables according to one embodiment of the present invention.

FIG. 12 illustrates a flowchart of another exemplary video encoding system that incorporates Non-Adjacent History-based MVP tables according to one embodiment of the present invention. Pixel data associated with a current block are received in step 1210. Current motion information is derived for the current block in step 1220. One or more first non-adjacent MVP (Motion Vector Prediction) candidates are derived based on previously decoded motion information in a first region comprising a current CTU (coding tree unit) of the current block in step 1230, wherein the first region is limited to be within one or more pre-define distances in a vertical direction, a horizontal direction or both from the current CTU, and wherein if a to-be-referenced position is not inside the first region, the to-be-referenced position is mapped to a mapped position of the first region before referencing corresponding motion and if the mapped position of the first region has no motion, a predefined default motion or neighbouring motion at a neighbouring position is used as the corresponding motion. A merge candidate list comprising said one or more first non-adjacent MVP candidates is generated in step 1240. The current motion information for the current block is encoded according to the merge candidate list in step 1250.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding, the method comprising:

receiving coded data associated with a current block to be decoded at a decoder side;

deriving one or more first non-adjacent MVP (Motion Vector Prediction) candidates based on previously decoded motion information in a first region comprising a current CTU (coding tree unit) of the current block, wherein the first region is limited to be within one or more pre-defined distances in a vertical direction, a horizontal direction or both from the current CTU, and wherein if a to-be-referenced position is not inside the first region, the to-be-referenced position is mapped to a mapped position of the first region before referencing corresponding motion and if the mapped position of the first region has no motion, a predefined default motion or neighbouring motion at a neighbouring position is used as the corresponding motion;

generating a merge candidate list comprising said one or more first non-adjacent MVP candidates; and deriving current motion information for the current block from the coded data according to the merge candidate list.

2. The method of claim 1, wherein the neighbouring position corresponds to a left 4×4 block, a right 4×4 block, a top 4×4 block, or a bottom 4×4 block of the mapped position, or a first left or right 4×4 block of the mapped position having motion information.

3. A method of video encoding, the method comprising:

receiving pixel data associated with a current block at an encoder side;

deriving current motion information for the current block;

deriving one or more first non-adjacent MVP (Motion Vector Prediction) candidates based on previously encoded motion information in a first region comprising a current CTU (coding tree unit) of the current block, wherein the first region is limited to be within one or more pre-defined distances in a vertical direction, a horizontal direction or both from the current CTU, and wherein if a to-be-referenced position is not inside the first region, the to-be-referenced position is mapped to a mapped position of the first region before referencing corresponding motion and if the mapped position of the first region has no motion, a predefined default motion or neighbouring motion at a neighbouring position is used as the corresponding motion;

generating a merge candidate list comprising said one or more first non-adjacent MVP candidates; and encoding the current motion information for the current block according to the merge candidate list.

4. The method of claim 3, wherein the neighbouring position corresponds to a left 4×4 block, a right 4×4 block, a top 4×4 block, or a bottom 4×4 block of the mapped position, or a first left or right 4×4 block of the mapped position having motion information.

* * * * *